United States Patent
Albrecht et al.

[11] Patent Number: 6,055,133
[45] Date of Patent: Apr. 25, 2000

[54] DISK DRIVE HEAD SUPPORT ARM AND ARM ASSEMBLY UTILIZING PLURAL DATUM FEATURES

[75] Inventors: David W. Albrecht, San Jose, Calif.; Akihiko Aoyagi, Fujisawa, Japan; Hitoshi Tsujino, Fujisawa, Japan; Masahiko Katoh, Fujisawa, Japan; Tzong-Shii Pan, San Jose, Calif.

[73] Assignee: International Business Machines Corporation, Armonk, N.Y.

[21] Appl. No.: 09/153,570

[22] Filed: Sep. 15, 1998

[30] Foreign Application Priority Data

Sep. 29, 1997 [JP] Japan .................................. 9-254596

[51] Int. Cl.⁷ .................................................. G11B 5/48
[52] U.S. Cl. .............................................................. 360/104
[58] Field of Search ................................. 360/104–106; 29/603.03, 603.04

[56] References Cited

U.S. PATENT DOCUMENTS

| | | | |
|---|---|---|---|
| 5,631,788 | 5/1997 | Richards | 360/104 |
| 5,650,896 | 7/1997 | Viskochil | 360/106 |
| 5,656,877 | 8/1997 | Loubier | 310/13 |
| 5,657,531 | 8/1997 | Sato et al. | 29/603.04 |
| 5,717,544 | 2/1998 | Michael | 360/104 |
| 5,805,377 | 9/1998 | Lerdal et al. | 360/97.01 |
| 5,838,518 | 11/1998 | Frater | 360/104 |
| 5,892,637 | 4/1999 | Brooks, Jr. et al. | 360/104 |
| 5,953,183 | 9/1999 | Butler et al. | 360/106 |
| 5,966,269 | 10/1999 | Marek et al. | 360/104 |
| 5,969,906 | 10/1999 | Arya et al. | 360/104 |

*Primary Examiner*—Jefferson Evans
*Attorney, Agent, or Firm*—Douglas R. Millett

[57] ABSTRACT

A head support arm of a disk drive device of the present invention comprises: an arm member having a rear portion with a pivot center and a front portion, a suspension load beam member having a rear portion fixed to the front portion of the arm member and a front portion supporting a head/slider assembly, and a flexure attached to the suspension load member, and is characterized in that the suspension load beam member has a first datum feature, a second datum feature and a third datum feature, the first datum feature is located in a hinged portion that applies a load force to the head/slider assembly, the first datum feature is located in proximity and adjacent to a dimple for providing a gimbal motion of the head/slider assembly, the first datum feature has a V shaped portion, the second datum feature is a slot and is in proximity and adjacent to a spacer mounted at the pivot center of the arm member, and the third datum feature is a slot and is in proximity and adjacent to a front end of the arm member.

10 Claims, 9 Drawing Sheets

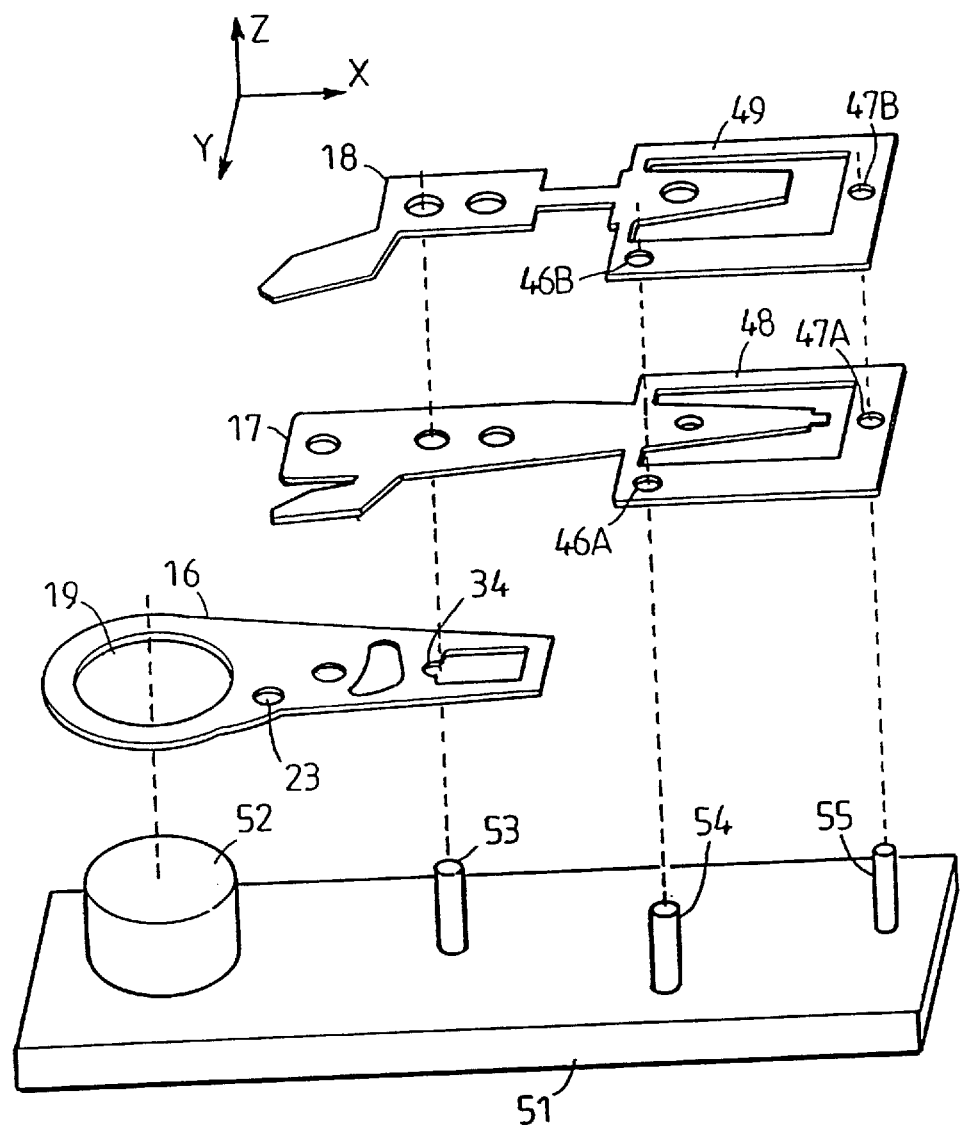
F I G. 5

DISK DRIVE HEAD SUPPORT ARM AND ARM ASSEMBLY UTILIZING PLURAL DATUM FEATURES

BACKGROUND OF THE INVENTION

1. Field of the Invention

The present invention relates to a head support arm with an improved datum system, an arm assembly for a disk drive device with the improved datum system, and a method for fabricating the head support arm and the arm assembly.

FIG. 1 shows a process for fabricating a prior head support arm. The head support arm 1 contains a carriage 2, a mount plate 3, a load beam 4 and a head/slider assembly 5. The carriage 2 is provided with a plurality of comb elements 2A, as well known in the art. The comb element 2 is provided with a swaging aperture 9, and the mount plate 3 is provided with a swaging boss 6. The swaging boss 6 and the swaging aperture 9 are fixed to each other as well known in the art. In the fabricating process, the load beam 4 is provided with a datum aperture 8 or a reference aperture used in an alignment. The boss 6 is used as a datum point in the alignment. In a first step, a center line of the mount plate 3 and a center line of the load beam 4 are aligned by using the datum boss 6 and the datum aperture 8. In a second step, both the mount plate 3 and the load beam 4 are coupled or fixed to each other by welding them at a plurality of spots 7. In a third step, a center line of a head/slider assembly 5 is aligned to the center line of the load beam 4 and fixed to the load beam 4. In a fourth step, the swaging boss 6 of the mount plate 3 is swaged to the swaging aperture 9 of the comb element 2A by using as datum points an aperture 10 into which a shaft is mounted and the datum aperture 8.

A similar structure to that shown in the FIG. 1 known in the art as a stackable arm (or unimount arm assembly, registered trademark of HTI Corp.) eliminates the mount plate 3, and welds the load beam 4 directly to a single arm 2 using the datum apertures 6, 8 and 10 for the alignment. A plurality of these arms are then arranged in parallel to create an arm assembly.

The alignment process uses the datum apertures 6, 8 and 10 to make the head supporting arm 1 in which all the center lines of the comb element 2A, the mount plate 3, the load beam 4 and the head/slider assembly 5 are aligned. Recently, the applicant of the present invention has proposed a head support arm in which an integrated wiring plate is mounted on the suspension load beam member, and a flexure is integrally formed on a front portion of the integrated wiring plate, and a head/slider assembly is mounted on the flexure. In this structure, it is additionally required to precisely align all the center lines of the arm member, the load beam member, the integrated wiring plate and the head/slider assembly. It is difficult to perform such precise alignment in the prior alignment process.

SUMMARY OF THE INVENTION

The object of the present invention is to provide a head support arm containing an arm member, a suspension load beam member, a head/slider assembly and an integrated wiring plate in which all the center lines are precisely aligned.

In an improved datum system for a head support arm of a disk drive device, in accordance with the present invention, which contains an arm member having a rear portion with a pivot center and a front portion, a suspension load beam member having a rear portion fixed to the front portion of the arm member and a front portion supporting a head/slider assembly, a flexure attached to the suspension load beam member, the suspension load beam member has a first datum feature, a second datum feature and a third datum feature, which are etched concurrently in a manufacturing process. The first datum feature is located in a hinged portion that applies a load force to the head/slider assembly. The first datum feature is located in proximity and adjacent to a dimple for providing a gimbal motion of the head/slider assembly. The first datum feature has a V shaped edge. The second datum feature is an elongated slot, and being in proximity and adjacent to a spacer mounted at the pivot center of the arm member. The third datum feature is an elongated slot, and being in proximity and adjacent to an front end of the arm member.

A head support arm of a disk drive device in accordance with the present invention comprises: an arm member having a rear portion with a pivot center and a front portion, a suspension load beam member having a rear portion fixed to the front portion of the arm member and a front portion supporting a head/slider assembly, and a flexure attached to the suspension load beam member, characterized in that the suspension load beam member has a first datum feature, a second datum feature and a third datum feature, the first datum feature is located in a hinged portion that applies a load force to the head/slider assembly, the first datum feature is located in proximity and adjacent to a dimple for providing a gimbal motion of the head/slider assembly, the first datum feature has a V shaped portion, the second datum feature is a slot and is in proximity and adjacent to a spacer mounted at the pivot center of the arm member, and the third datum feature is a slot and is in proximity and adjacent to an front end of the arm member.

An integrated wiring plate is mounted on the suspension load beam member, the flexure is integrally formed as a part of the integrated wiring plate, and the integrated wiring plate has an extended plate which cantilevers from one of side edges of the head support arm.

The suspension load beam member has an extended plate which cantilevers from one of side edges of the head support arm, and the extended plate supports a portion or all of the extended plate of the integrated wiring plate.

An arm assembly for a disk drive device in accordance with the present invention comprises: a plurality of head support arms arranged in parallel to each other with a spacer, and a circuit board provided with a plurality of electrically conductive pads, wherein the head support arm comprises: an arm member having a rear portion with a pivot center and a front portion, a suspension load beam member having a rear portion fixed to the front portion of the arm member and a front portion supporting a head/slider assembly, and an integrated wiring plate being mounted on the suspension load beam member, the integrated wiring plate having an extended plate which cantilevers from one of side edges of the head support arm, the integrated wiring plate being provided with a flexure, the extended plate being provided with a plurality of electrically conductive pads which are connected to the plurality of electrically conductive pads of the circuit board, respectively, characterized in that the suspension load beam member has a first datum feature, a second datum feature and a third datum feature, the first datum feature is located in a hinged portion that applies a load force to the head/slider assembly, the first datum feature is located in proximity and adjacent to a dimple for providing a gimbal motion of the head/slider assembly, the first datum feature has a V shaped portion, the second datum feature is a slot and is in proximity and adjacent to the spacer mounted at the pivot center of the arm member, the third datum feature is a slot and is in proximity and adjacent to a front end of the arm member.

A method for fabricating a head support arm in accordance with the present invention comprises steps of:

(a) preparing the head support arm containing (i) an arm member having a rear portion with a pivot center and a front portion, and (ii) a suspension load beam member having a rear portion fixed to the front portion of the arm member and a front portion supporting a head/slider assembly, and having a first datum feature, a second datum feature and a third datum feature, the first datum feature being located in a hinged portion that applies a load force to the head/slider assembly, the first datum feature being located in proximity and adjacent to a dimple for providing a gimbal motion of the head/slider assembly, the first datum feature having a V shaped portion, the second datum feature being a slot, and being in proximity and adjacent to a spacer mounted at the pivot center of the arm member, and the third datum feature being a slot, and being in proximity and adjacent to an front end of the arm member, and (iii) an integrated wiring plate mounted on the suspension load beam member, and provided with a flexure;

(b) fixing the arm member, the suspension load beam member, and the integrated wiring plate; and (c) mounting the head/slider assembly on a front end of the integrated wiring plate of the head support arm by inserting datum pins of a first tool into the first datum feature and the second datum feature, respectively, the first tool supporting the head/slider assembly at a predetermined position.

A method for fabricating an arm assembly for a disk drive device having a plurality of head support arm in accordance with the present invention comprises the steps of:

(a) preparing a plurality of the head support arms each of which contains (i) an arm member having a rear portion with a pivot center and a front portion, and (ii) a suspension load beam member having a rear portion fixed to the front portion of the arm member and a front portion supporting a head/slider assembly, and having a first datum feature, a second datum feature and a third datum feature, the first datum feature being located in a hinged portion that applies a load force to the head/slider assembly, the first datum feature being located in proximity and adjacent to a dimple for providing a gimbal motion of the head/slider assembly, the first datum feature having a V shaped portion, the second datum feature being a slot, and being in proximity and adjacent to a spacer mounted at the pivot center of the arm member, and the third datum feature being a slot, and being in proximity and adjacent to a front end of the arm member, and (iii) an integrated wiring plate mounted on the suspension load beam member, and being provided with a flexure;

(b) fixing the arm member, the suspension load beam member, and the integrated wiring plate;

(c) mounting the head/slider assembly on a front end of the integrated wiring plate of each of the head support arms by inserting datum pins of a first tool into the first datum feature and the second datum feature, respectively, the first tool supporting the head/slider assembly at a predetermined position; and (d) arranging the plurality of head support arms in parallel to each other by inserting datum pins of a second tool into the pivot center of each of the arm member and the third datum feature, respectively, of each of the suspension load beam member.

In the step (c), the datum pin inserted into the second datum feature is moved to cause the load beam member to engage the datum pin inserted into the first datum with the V shaped portion of the first feature.

In the step (d), a spacer with an aperture is placed at the pivot center of each of the head support arms, and each of the head support arms is provided with a fixing aperture which is aligned to the aperture of the spacer, and the method comprises a step of fixing the plurality of head support arms by a fixing means passing through the fixing aperture of each of the plurality of head support arm and the aperture of each of the spacers.

In a head support arm for disk drive device in accordance with the present invention in which the head support arm has a rear portion which is provided with a pivot aperture through which a shaft is mounted and a front portion which supports a head/slider assembly, the head support arm flexes along a boundary line located adjacent to the pivot aperture, the boundary line extends across a width of the head support arm to extend between a first position on a first edge of the head support arm and a second position on a second edge of the head support arm and the boundary line is inclined from a line which is vertical to a center line of the head support arm, and the first position is nearer to the pivot aperture than the second position, a first aperture is provided at a position adjacent to the boundary line, characterized in that a distance between the first edge and the first aperture is longer than a distance between the second edge and the first aperture.

The first aperture has a first portion adjacent to the first edge and a second portion adjacent to the second edge which are divided by the center line of the head support arm, and an area of the first portion is smaller than an area of the second portion.

A second aperture provided at a position adjacent to the first aperture, and characterized in that a distance between the first edge and the second aperture is shorter than a distance between the second edge and the second aperture. The second aperture has a first portion adjacent to the first edge and a second portion adjacent to the second edge which are divided by the center line of the head support arm, and an area of the first portion is larger than an area of the second portion.

For a fuller understanding of the nature and advantages of the present invention, reference should be made to the following detailed description taken in conjunction with the accompanying drawings.

BRIEF DESCRIPTION OF THE DRAWINGS

FIG. 5 shows the step for aligning the arm member, the suspension load beam member and the integrated wiring plate in accordance with the present invention.

DESCRIPTION OF THE PREFERRED EMBODIMENT

Figure 1:
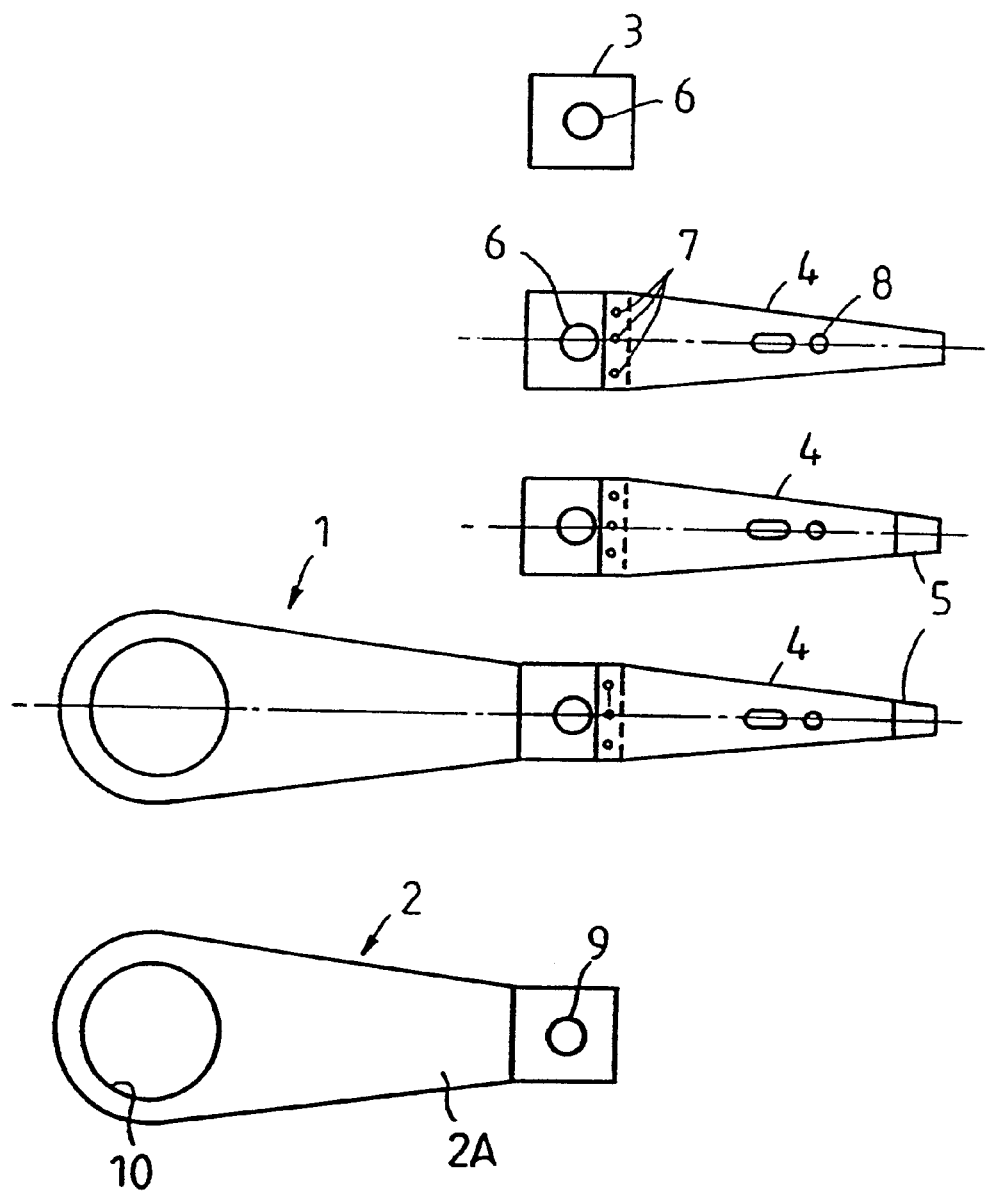
FIG. 1 shows the fabrication process of the prior art head support arm.

Referring to FIGS. 2, 3, 4 and 5, a head support arm 15 in accordance with the present invention contains an arm member 16, a suspension load beam member 17, an integrated wiring plate 18 and a head/slider assembly 20. An aperture 19 which used as a pivot center is formed on a rear portion of the arm member 16 of the head support arm 15, and the head/slider assembly 20 is mounted on a front portion of the head support arm 15. A shaft or a bearing assembly for supporting the head support arm 15 is mounted into the aperture 19. The bearing assembly is not shown in the figures since it is well known in the art.

Figure 2:
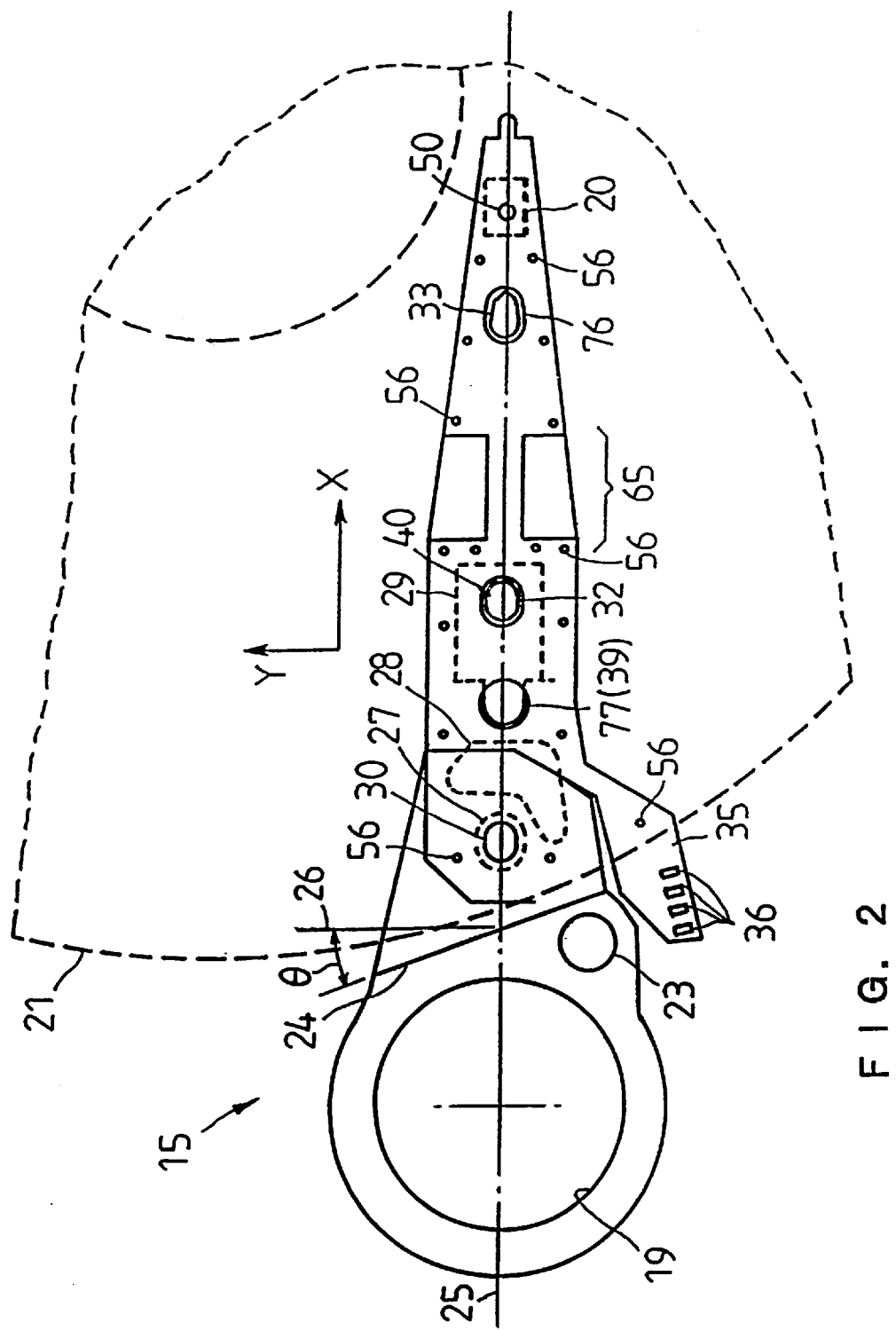
FIG. 2 shows the head support arm with the improved datum system in accordance with the present invention.
Figure 7:
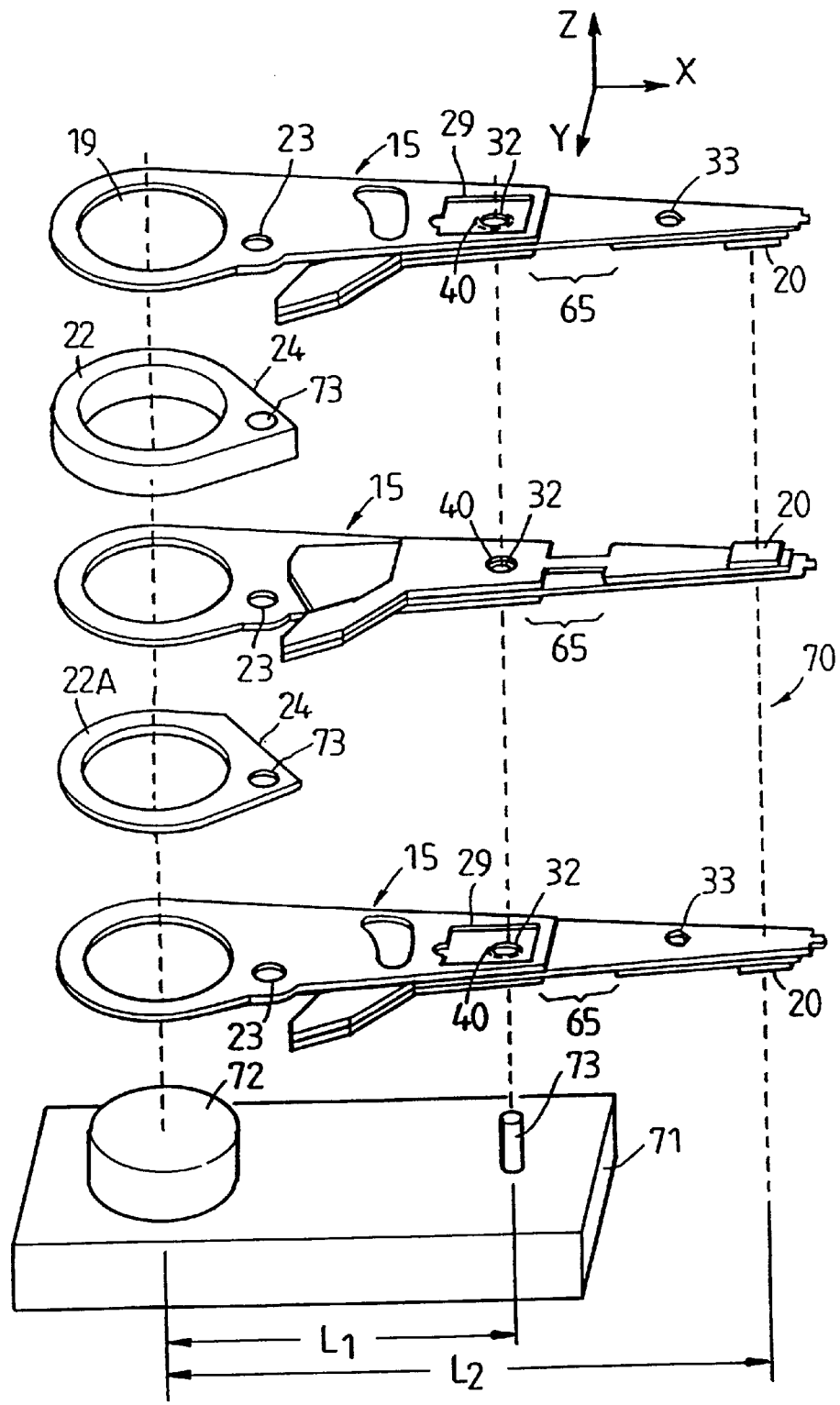
FIG. 7 shows the step for aligning a plurality of head support arms in accordance with the present invention.

The head support arm 15 is positioned with respect to a rotating data recording disk 21, as shown in FIG. 2. A spacer 22 is mounted between the rear portions of two head support arms 15, as shown in FIG. 7. Since an aperture 73 is provided on the spacer 22 for the reasons described after, and it is desirable to decrease a distance between a center of the aperture 19 and a rotational center of the disk 21 to a minimum distance to realize a small size disk drive device, an edge 24 of the spacer 22 is inclined from a line 26 which is vertical to a center line 25 of the head support arm 15 by an angle θ, and hence the arm member 15 tends to flex at the line of the edge 24 of the spacer 22 though the arm member 16 is made of a relatively rigid material.

The line defined by the edge 24 of the spacer 22 is called as a boundary line in the specification.

As shown in FIGS. 2 through 7, the X axis represents a longitudinal direction, i.e. the direction of the center line 25 of the head support arm 15, the Y axis represents the direction of the width of the head support arm 15, and the Z axis represents the direction of the center line of the bearing assembly mounted in the aperture 19. The Z axis is perpendicular to the X and Y axes.

Figure 3:
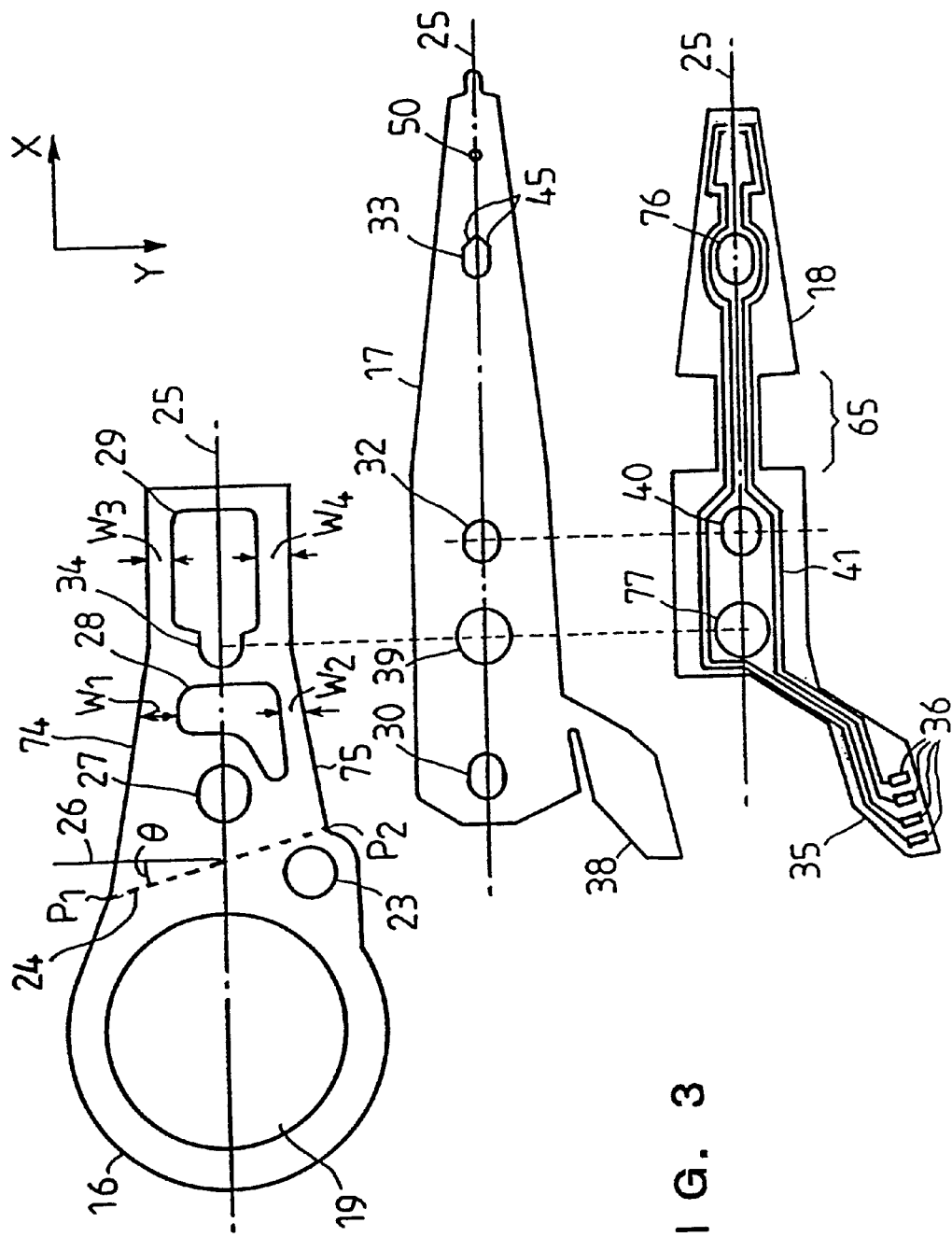
FIG. 3 shows the arm member, the suspension load beam member, and the integrated wiring plate of the head support arm shown in FIG. 2.

Referring to FIG. 3, an aperture 27, an aperture 28 and an aperture 29 are formed in the arm member 16. An aperture 29 contains a left side slot 34. The functions of the apertures are described hereafter. An elongated slot 30, 32 and 33 and an aperture 39 are formed concurrently by an etching process on the suspension load beam member 17 to a precise dimensional tolerance that is less than 18 microns for both size and colinearity. The integrated wiring plate 18 is formed with an apertures 77, 40 and 76. The integrated wiring plate 18 has an extended plate 35 which cantilevers from one side edge of the head support arm 15. A plurality of electrically conductive pads 36 are provided on the extended plate 35. In the case that a MR (Magneto resistive) read/write head which contains a read element and a write element is used, four connecting pads 36 are required, and a first pair of two pads 36 is connected to the read element and a second pair of the remaining two pads 36 is connected to the write element through four wiring conductors 41, respectively. The suspension load beam member 17 has a cantilevered extended plate 38 that supports a portion or all of the like extended plate 35 of the integrated wiring plate 18.

Figure 4:
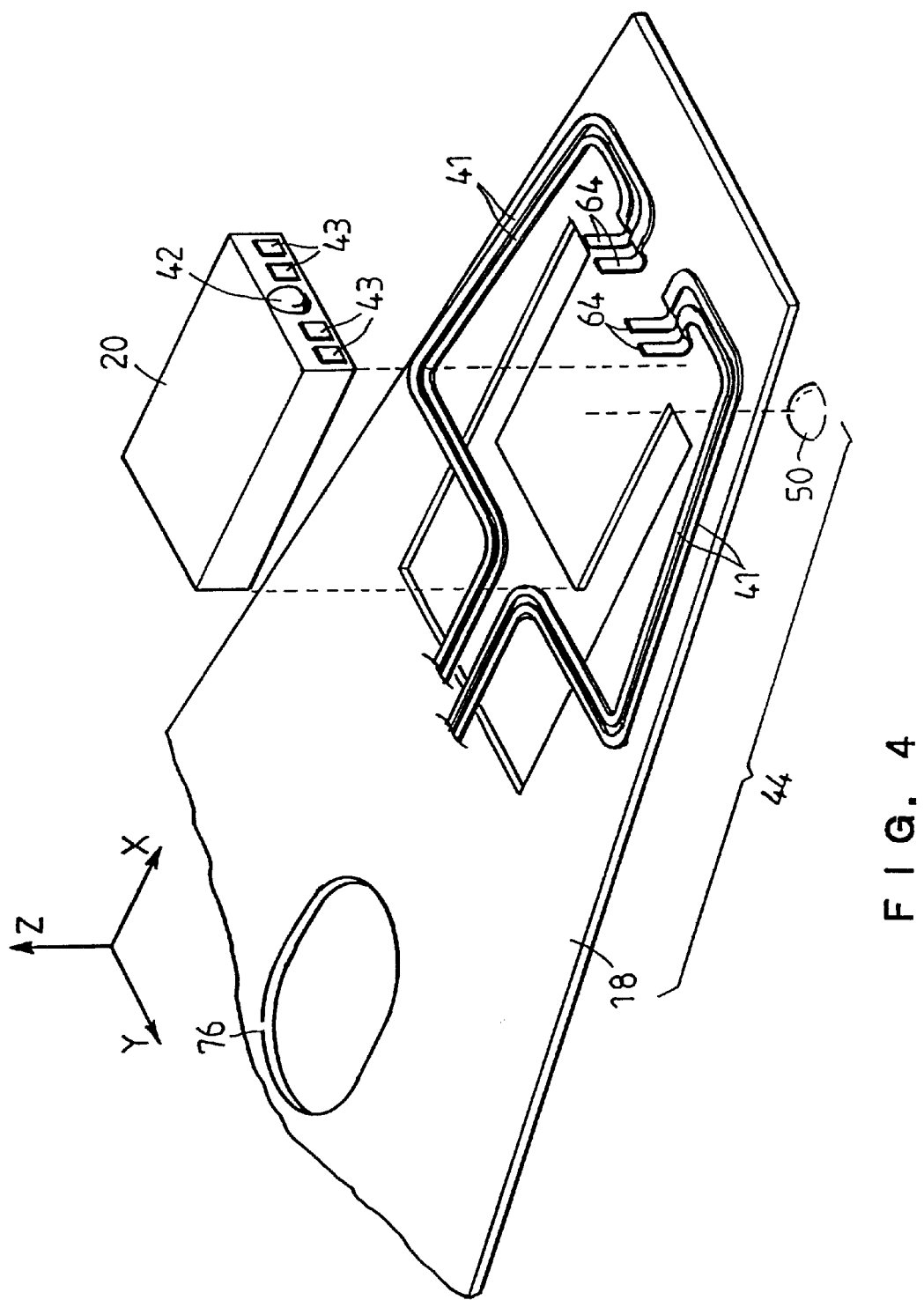
FIG. 4 shows the front portion of the integrated wiring plate and the head/slider assembly.

Referring to FIG. 4, a detail of the front portion of the integrated wiring plate 18 and the head/slider assembly 20 containing the MR head 42 are shown. A portion 44 of the integrated wiring plate 18 is used as a flexure for the head/slider assembly 20, and the head/slider assembly 20 is fixed to a tongue of the flexure 44 by an adhesive material, as shown by dotted lines. Four pads 43 are connected to the read element and the write element of the MR head 42. The four ends 64 of the wiring patterns 41 are formed and are precisely located to the first datum feature 33 with the V shaped edge 45 and the second datum feature 30 of the suspension load beam member 17, and are connected to the pads 43, respectively. The integrated wiring plate 18 contains a substrate which is made of a stainless steel plate and a dielectric layer, polyimide layer for example, and the wiring pattern 41 or the electrical conductor made of the electrically conductive material, copper (Cu) for example. Since the flexure 44 is made of the stainless steel, and a dimple 50 provided on the suspension load beam member 17 supports the center of the back side surface of the flexure 44, the flexure 44 and the head/slider assembly 20 can perform a gimbal type motion.

Describing the relationship of the reference apertures which are used as the datum point, datum feature or reference point in the process for assembling the head support arm 15, the slots 34 and the aperture 19 of the arm member 16 are used as the datum point or datum feature for aligning the center lines of the arm member 16, the suspension load beam member 17 and the integrated wiring plate 18 in assembling these three components, as described later with reference to FIGS. 5 and 9. The elongated slots 30 and 33 with V shaped edges 45 are used as the datum point for aligning the center line of the head support arm 15 and the load beam dimple 50 with the center line of the head/slider assembly 20, as described later with reference to FIG. 6. A front end of the elongated slot 33 has the V shaped edges 45, as shown in FIG. 3. The aperture 19 and the elongated slot 32 are used as the datum point for aligning the center lines of a plurality of head support arms 15 to each other when the plurality of head support arms 15 are stacked with each other and with the spacer 22, as described later with reference to FIG. 7.

The size of the aperture 27 of the arm member 16 is larger than the size of the datum elongated slot 30, and the centers of the aperture 27 and the datum slot 30 are aligned. The size of the aperture 39 of the suspension load beam member 17 is larger than the size of the datum slot 34 of the arm member 16, and a left edge of the datum slot 34 is apart from an edge of the aperture 39. The integrated wiring plate 18 typically has three large apertures 77, 40 and 76. The aperture 77 is larger than the slot 34, the aperture 40 is larger than the datum elongated slot 32, and the aperture 76 is larger than the datum elongated slot 32 with the V shaped edge. In an alternative embodiment, specific features of apertures 76 and 77 are not necessarily larger, but are colinear with the respective edges of the load beam feature 33 and the arm feature 34 and are used as shown in FIG. 9. The elongated slot 33 with the V shaped edge 45 used as a datum feature is located in a hinged portion between the bending portion 65 and the front end of the head support arm 15, which applies a load force to the head/slider assembly 20, the elongated slot 33 is located close to the dimple 50 on the load beam member 17 for providing a gimbal motion of the head/slider assembly 20. The elongate slot 30 used as the datum feature is located close to a spacer 22 mounted at the pivot center or the aperture 19 of the arm member 16. The elongated slot 32 used as the datum feature is close to the front end of the arm member 16.

Figure 6:
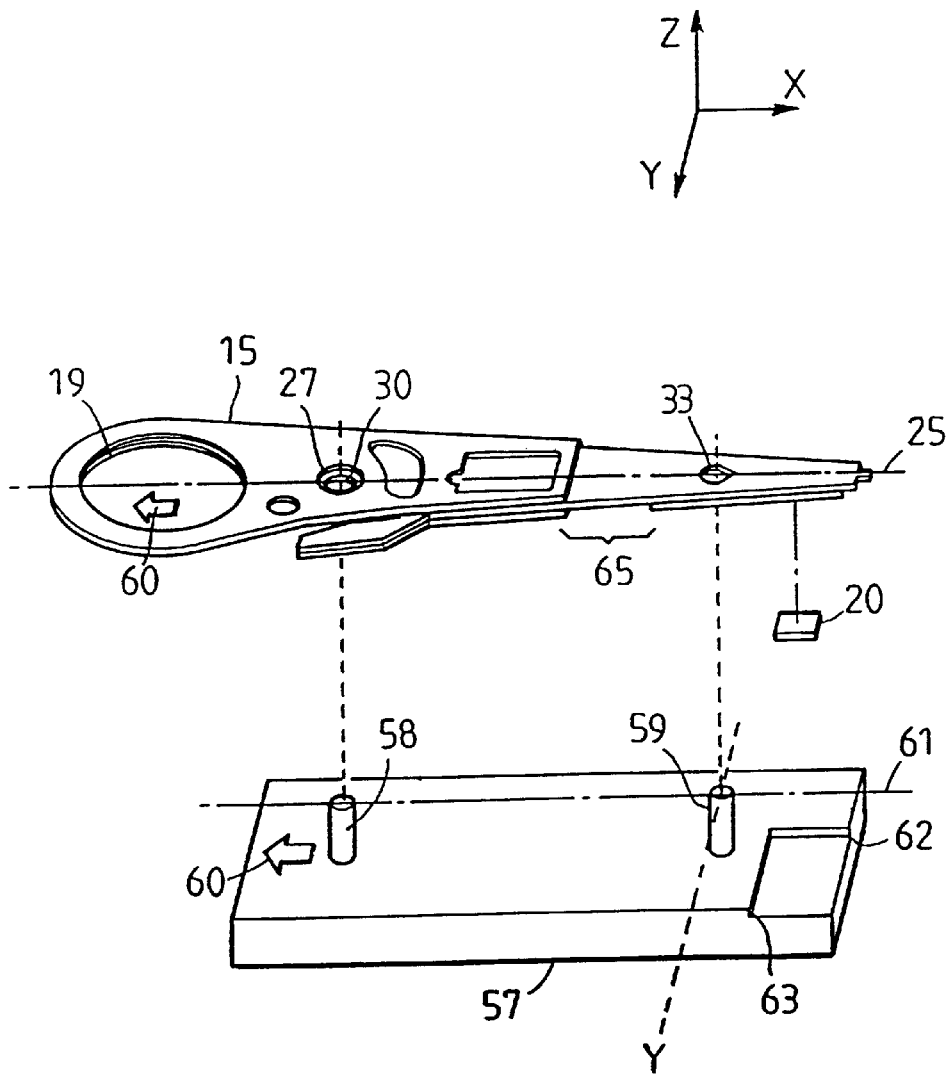
FIG. 6 shows the step for aligning the head/slider assembly to the head support arm in accordance with the present invention.

Describing the fabrication method of the head support arm 15 in accordance with the present invention with referring to FIGS. 5, 6 and 7, FIG. 5 shows the steps for assembling the arm member 16, the suspension load beam member 17 and the integrated wiring plate 18. The suspension load beam member 17 and the integrated wiring plate 18 with removable parts 48 and 49, respectively are fabricated by a conventional masking and etching process. Aperture 46A and 47A are formed on the part 48, and aperture 46B and 47B are formed on the part 49. By using a common mask pattern, the shapes of the suspension load beam member 17 and the integrated wiring plate 18 and the positions of the apertures 46A, 46B, 47A and 47B are critically and precisely controlled with a high degree of accuracy to the first datum feature 33 and the second datum feature 30.

The inventors of the present invention have found that, to realize the critically controlled flying height of the head/slider assembly 20 on the surface of the rotating data recording disk 21, the following three conditions (A), (B) and (C) must be satisfied. (A) the center lines of the arm member 16, the suspension load beam member 17 and the integrated wiring plate 18 should be precisely aligned to each other, (B) the center lines of the head/slider assembly 20 and the MR head 42 should be precisely aligned to the center lines of the arm member 16, the dimple 50 of the suspension load beam member 17 and the integrated wiring plate 18, since the head/slider assembly 20 is mounted on the flexure 44 provided on the integrated wiring plate 18, and (C) the ends 64 of the four wiring patterns 41 should be precisely located to the head/slider assembly 20 and connected to the pads 43, respectively. The termination pads 36 of the integrated wiring plate 18 should also be accurately referenced in the X-Y plane to the arm aperture 19 and the load beam slot aperture 32 to allow for accurate alignment of these pads to the corresponding pads on the circuit board 67 during the process for assembling the arm assembly 66.

In the first step for assembling the arm member 16, the suspension load beam member 17 and the integrated wiring plate 18, a first jig 51 with four studs or datum pins 52 through 55 is used. To satisfy the above condition (A), the datum points, i.e. the aperture 19 and the slot 34 of the arm member 16 and the apertures 46A, 46B, 47A and 47B are used, and are fitted onto the studs 52 through 55, respectively, as shown by the dotted lines in FIG. 5. In a second step, the arm member 16, the suspension load beam member 17 and the integrated wiring plate 18 are fixed by welding at plurality points 56, as shown in FIG. 2. Only five welding points are shown by the reference number 56 for simplifying the drawing.

In the arm assembly process described with reference to FIG. 5, the datum features 46B and 47B of the integrated wiring plate 18 and the datum features 46A and 47A are used only as the preferred choice, and the datum features 33 and 30 of the suspension load beam member 17 are not used.

Figure 9:
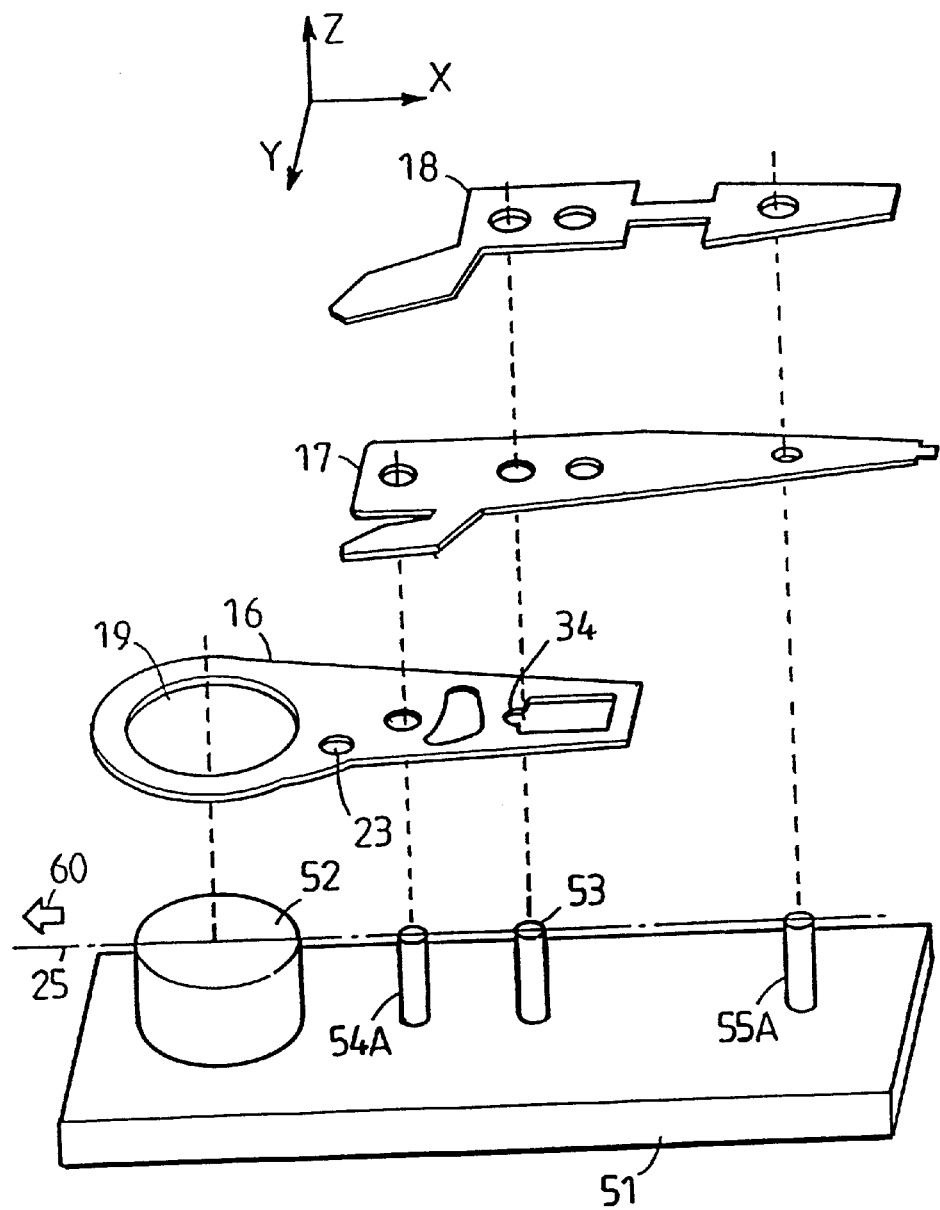
FIG. 9 shows the step for aligning the arm member, the suspension load beam member and the integrated wiring plate in accordance with the present invention.

The merits of the present invention can be also realized and understood in the process shown in FIG. 9. In the embodiment shown in FIG. 9, the slot 76 of the integrated wiring plate 18 is provided with a V shaped edge, not shown, etched to align to the center line. The side edges of the slot 76 with the V shaped edge parallel to the center line 25 and the side edges of the slot 33 with the V shaped edge 45 parallel to the center line 25 are to be colinear with the side edges of the slot 34 parallel to the center line 25. Tooling datum pins 52, 54A, 53 and 55A of a jig 51 are all colinear along the axis 25. The arm member 16 aligns on the tooling pins 52 and 53, the suspension load beam member 17 aligns on the datum pins 54A and 55A, and the integrated wiring plate 18 aligns on the datum pins 53 and 55A, and the V shaped edge of the slot 76 of the integrated wiring plate 18 and the V shaped edge 45 of the slot 33 are moved against the datum pin 55A by a bias force in a direction of an arrow 60. Next, the arm member 16, the suspension load beam member 17 and the integrated wiring plate 18 are fixed by the welding process, as previously described.

FIG. 6 shows a third step for mounting the head/slider assembly 20 to the head support arm 15 by using a second jig 57 with two pins or studs 58 and 59. To satisfy the above conditions (B) and (C), i.e. the center lines of the head/slider assembly 20 and the MR head 42 should be precisely aligned to the center lines of the arm member 16, and the dimple 50 of the load beam 17 and the integrated wiring plate 18, and the ends 64 of the four wiring patterns 41 should be precisely connected to the pads 43, respectively, the elongated slot 30 and the elongated slot 33 with the V shaped edge are used as the datum point. The reason why these datum points 30 and 33 are used is explained below. The two pairs of datum points, that is, the first pair of the datum points 19 and the datum points 33 and the second pair of the datum point 30 and 33, are considered. The important point to be considered is the degree of precision of these datum points 19, 30 and 33. Since the aperture 19 is one for receiving the shaft or bearing assembly which mounted on a frame of the disk drive device, the fabrication tolerance of the aperture 19 is larger than the tolerance of the elongated slot 30, and is in a separate arm member 16 from the load beam member 17.

In contradistinction, the elongated slots 30 and 33 which are made in a common load beam member 17 by the photolithographic technology, which can realize the precision of micron orders, have a degree of precision higher than that of the aperture 19. The critical dimple feature 50 in the load beam member 17 for gimbaling the head/slider assembly 20 can also be the most precisely referenced and located to the datum features 30 and 33 in the same member.

For the above reasons, the datum points 30 and 33 are used in the third step shown in FIG. 6. The datum points 30 and 33 are fitted onto the studs 58 and 59, respectively, and the stud 58 is moved in the direction shown by an arrow 60, or the pin 58 is fixed and the aperture 19 is moved in a direction of the arrow 60, whereby the head support arm 15 is entirely moved in the direction 60 to fully fit for the V shaped edge 45, shown in FIG. 3 to the stud 59. This causes the center line 25 of the head support arm 15 to be precisely aligned to line 61 connecting the centers of the studs 58 and 59. A recess defined by alignment walls 62 and 63 is formed on the surface of the second jig 57, and before the fitting the head support arm 15 onto the studs 59 and 59, the head/slider assembly 20 is so placed in the recess to contact their side walls to the alignment walls 62 and 63, respectively, whereby the center line of the head/slider assembly 20 is precisely aligned to the center line 61 and the Y axis passing through the center of the pin 59.

The connection between the flexure 44 shown in FIG. 4 and the head/slider assembly 20 is made by the adhesive material. The electrical connection is then made between the ends 64 of the wiring patterns 41 and the pads 43 of the head/slider assembly 20 by an ultrasonic bonding or the soldering process for example. It is apparent that, at the end of the third step shown in FIG. 6, the head support arm 15 which satisfies all the above described conditions (A), (B) and (C) has been assembled. Further, it is apparent that an additional condition (D) that the distance $L_2$ between the center of the aperture 19 and the center of the head/slider assembly 20 of each head support arm 15 should be precisely controlled has been satisfied.

FIG. 7 shows the fourth step for assembling a plurality of head support arms 15 into the arm assembly 66. For simplifying the drawings, only three head support arms 15 are shown. In the fourth step, the aperture 19 and the elongated slot 32 are used as the datum point. To precisely align the centers of the plural head/slider assemblies 20 to each other, on the line 70, it is desirable to select two datum points, such as the combination of the aperture 19 and the elongated slot 33, between which the longest distance exists.

However, the combination of the aperture 19 and the elongated slot 33 is not used, and the combination of the aperture 19 and the elongated slot 32 is used as the datum points in FIG. 7 for the following reasons. The load beam member 17 of the head support arm 15 is provided with a bending portion 65. When the data recording disk 21 is not rotated, the front portion of the head support arm 15 is bent towards the surface of the data recording disk 21, whereby the head/slider assembly 20 is biased to the surface of the disk 21 by a bias force determined by the bending portion 65. When the data recording disk 21 is rotated by the spindle motor, the head/slider assembly 20 flies on the surface of the disk 21 due to a well known air bearing effect. To keep the flying height of each of the head/slider assemblies 20 to the same value, it is not desirable to disturb the formed shape and a gram load of the bending portion 65 by unnecessarily applying any forces to the datum point 33 of the suspension load beam member 17 in the assembling process of the arm assembly 66. Similarly, it is not desirable to unnecessarily apply any lateral forces to the datum feature 33 during this process. If the forces are applied, this can disturb the shape of the bending portion 65, and adversely affect the gain of the first torsion mode of the suspension, whereby it adversely affects the ability of the actuator servo loop to rapidly and precisely control the position of the head/slider assembly 20, so that a desired read/write operation can not be performed. This means that if the elongated slot 33 is used as the datum point in the step shown in FIG. 7, undesired force is applied to the bending portion 65 which causes the above described problems.

In contradistinction, the elongated slot 32 of the suspension load beam member 17 is integrated with the relatively rigid arm member 16 by the plural welding points 56, the elongated slot 32 and the aperture 19 provide the rigid datum points for assembling the plural head support arms 15. In this manner, the elongated slot 32 provided adjacent to the front end of the arm member 16 in combination with the aperture 19 provide the rigid datum point for assembling the arm assembly 66.

Figure 8:
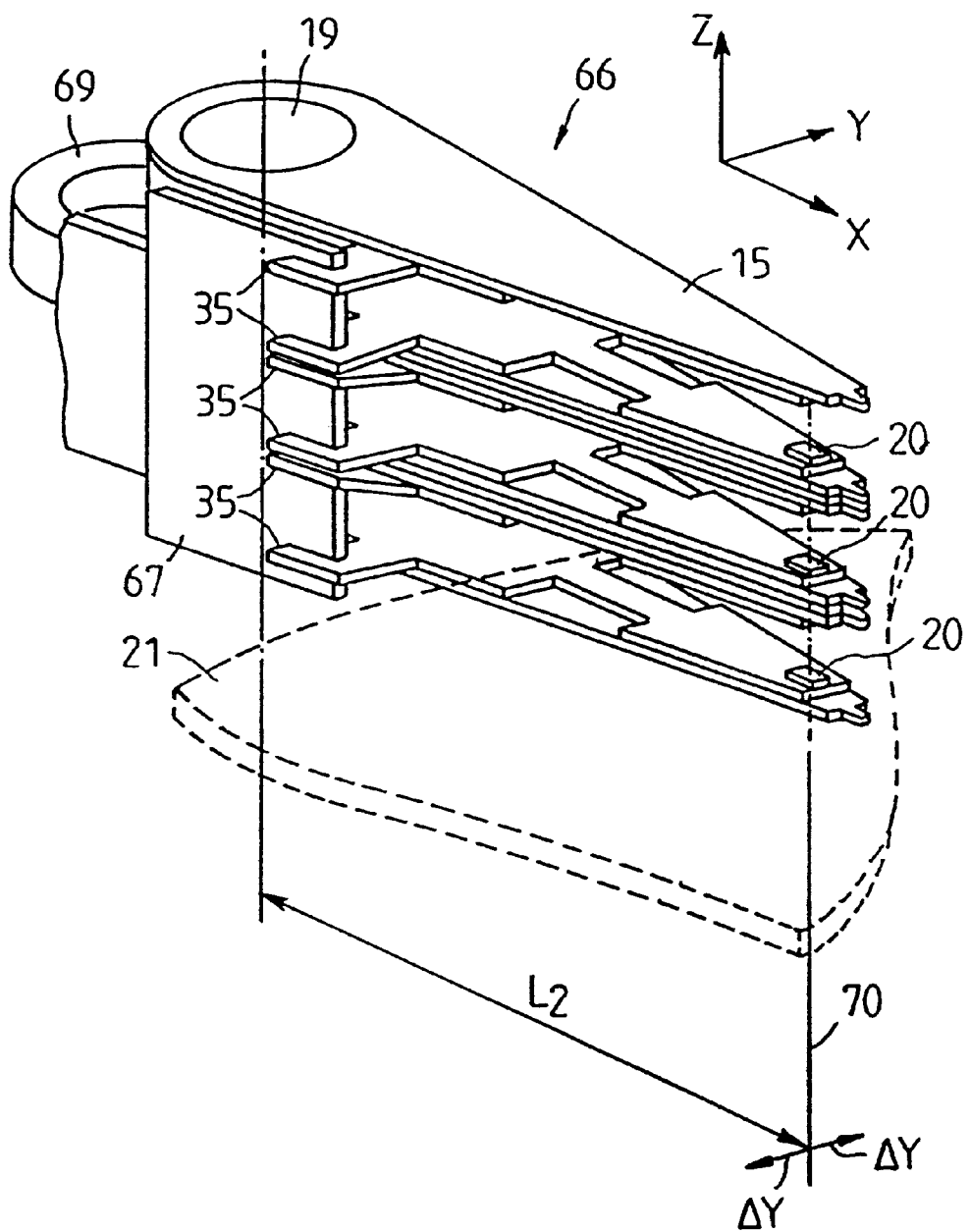
FIG. 8 shows the arm assembly assembled in accordance with the present invention.

Next, a plurality of the head support arms 15 are assembled into an arm assembly 66, as shown in FIG. 7. A circuit board 67 placed in the X-Z plane is shown in FIG. 8. Connecting pads, not shown, which are connected to the pads 36 of the extended plate 35 of each head support plate 15 are provided on the circuit board 67. The connecting pads on the circuit board 67 are connected to a read/write control circuit contained in the disk drive device through wiring conductors, not shown, provided on the circuit board 67. A voice coil motor (VCM) 69 is mounted to the arm assembly 66 to move the head/support assemblies 20 along a radial direction of the rotating data recording disk 21. The data recording disk 21 is rotated by a drive motor, such as a spindle motor not shown. The operation of the VCM 69, the read/write control circuit and the spindle motor is controlled by a main control circuit, such as MPU, contained in the disk drive device.

To cause all the MR head 42 of the head/slider assembly 20 to access the same data recording cylinder position of each data recording disk 21, it is necessary to satisfy the following condition (E) that the center of the head/slider assembly 20 should be on the line 70 which is parallel to the Z axis. If the position of the head/slider assembly 20 is displaced from the line 70 by a distance Y, the displaced MR head accesses a wrong data recording track, thereby the desired read/write operation can not be performed.

In a next step, a screw, not shown, is passed through the apertures 23 and 73, and the head support arms 15 and the spacers 22 are fixed to each other. In a next step, the structure is removed from the jig 71, and the circuit board 67 is positioned as shown in FIG. 8, and the pads on the circuit board 67 and the pads 36 on the extended plates 35 of the head support arms 15 are connected by a solder for example. In a next step, the structure is cleaned in a cleaning process. In a next step, the apertures 19 of the arm assembly 66 are mounted on the bearing assembly, not shown, which is fixed to the frame of the disk drive device. The bearing assembly provides an additional clamping force and fixing of the arms at the area adjacent to the aperture 19. The arm assembly 66 does not necessarily employ a thin spacer 22A between the arms that fit between a pair of disks. In addition, one of the thick spacers 22 contains the coil for the VCM though it is not shown in the figure.

As described before, the relatively rigid arm member 16 tends to flex along the boundary line 24. More particularly, the boundary line 24 is located adjacent to the aperture 19, and extends the width of the arm member 16 between a first position $P_1$ on a first edge 74 of the arm member 16 and a second position $P_2$ on a second edge 75 of the arm member 16. The boundary line 24 is inclined from the line 26 which is perpendicular to the center line 25 by the angle θ. The first position $P_1$ is nearer to the aperture 19 than the second position $P_2$.

It is noted that the bending of the head support arm 15 for flying the head/slider assembly 20 above the surface of the data recording disk 21 is made at the bending portion 65. But, the flexing of the rigid arm member 16 along the boundary line 24 affects the position of the head/slider assembly 20 since if the arm member 16 is flexed at the boundary line 24, the suspension load beam member 17 tends to do a rolling motion, so that the read and write elements of the MR head move off track, and a reliable writing and reading of the data to and from the data recording disk 21 can not be maintained.

To solve the above problem, the apertures 28 and 29 are formed on the arm member 16. The aperture 28 is formed adjacent to the boundary line 24 and is divided into a first or upper half and a second or lower half by the center line 25. An area of the upper half adjacent to the first edge 74 is smaller than an area of the lower half adjacent to the second edge 75. The major part of the lower half extends substantially along the center line 25. A width $W_1$ between the upper edge of the aperture 28 and the first edge 74 is wider than a width $W_2$ between the lower edge of the aperture 28 and the second edge 75. As a result, a stiffness of an upper half of the arm member 16 above the center line 25 becomes larger than a stiffness of a lower half of the arm member 16 below the center line 25. In other words, the lower half of the arm member 16 is weakened compared to the upper half to compensate for the difference in flex length parallel to the center line 25 from the boundary line 24 so as to minimize the rolling or torsion motion when the arm member 16 wants to bend. The aperture 29 also compensates the flex operation along the boundary line 24. A width $W_3$ between the upper edge of the aperture 29 and the first edge 74 is narrower than a width $W_4$ between the lower edge of the aperture 29 and the second edge 75, so that a weight of the part of the arm member 16 with the wider width $W_4$ is larger than a weight of the part of the arm member 16 with the narrower width $W_3$, whereby the flex operation along the boundary line 24 is compensated.

The present invention realizes the head support arm containing the arm member, the suspension load beam member, the integrated wiring plate, and the head/slider assembly in which all the center lines of these components are precisely aligned.

While the preferred embodiments of the present invention have been illustrated in detail, it should be apparent that modifications and adapatations to those embodiments may occur to one skilled in the art without departing from the scope of the present invention as set forth in the following claims.

We claim:

1. An improved datum system for a head support arm of a disk drive device, said head suspension arm including an arm member having a rear portion with a pivot center and a front portion, a suspension load beam member having a rear portion fixed to said front portion of said arm member and a front portion supporting a head/slider assembly, and a flexure attached to said suspension load beam member, wherein the improvement comprises:

said suspension load beam member having a first datum feature, a second datum feature and a third datum feature, which are etched concurrently in a manufacturing process;

said first datum feature being located in a hinged portion that applies a load force to said head/slider assembly;

said first datum feature being located in proximity and adjacent to a dimple for providing a gimbal motion of said head/slider assembly, said first datum feature having a V shaped edge;

said second datum feature being an elongated slot, and being in proximity and adjacent to a spacer mounted at said pivot center of said arm member; and said third datum feature being an elongated slot, and being in proximity and adjacent to an front end of said arm member.

2. A head support arm of a disk drive device comprising; an arm member having a rear portion with a pivot center and a front portion;

a suspension load beam member having a rear portion fixed to said front portion of said arm member and a front portion supporting a head/slider assembly; and a flexure attached to said suspension load beam member, characterized in that said suspension load beam member has a first datum feature, a second datum feature and a third datum feature, said first datum feature is located in a hinged portion that applies a load force to said head/slider assembly, said first datum feature is located in proximity and adjacent to a dimple for providing a gimbal motion of said head/slider assembly, said first datum feature has a V shaped portion, said second datum feature is a slot and is in proximity and adjacent to a spacer mounted at said pivot center of said arm member, and said third datum feature is a slot and is in proximity and adjacent to an front end of said arm member.

3. A head support arm of a disk drive device according to claim 2, wherein an integrated wiring plate is mounted on said suspension load beam member, said flexure is integrally formed as a part of said integrated wiring plate, said integrated wiring plate has an extended plate which cantilevers from one of side edges of said head support arm.

4. A head support arm of a disk drive device according to claim 3, wherein said suspension load beam member has an extended plate which cantilevers from one of side edges of said head support arm, and said extended plate supports a portion or all of said extended plate of said integrated wiring plate.

5. An arm assembly for a disk drive device comprising;

a plurality of head support arms arranged in parallel to each other with a spacer;

a circuit board provided with a plurality of electrically conductive pads;

said head support arm comprising;

an arm member having a rear portion with a pivot center and a front portion;

a suspension load beam member having a rear portion fixed to said front portion of said arm member and a front portion supporting a head/slider assembly; and an integrated wiring plate being mounted on said suspension load beam member, said integrated wiring plate having an extended plate which cantilevers from one of side edges of said head support arm, said integrated wiring plate being provided with a flexure, said extended plate being provided with a plurality of electrically conductive pads which are connected to said plurality of electrically conductive pads of said circuit board, respectively, characterized in that said suspension load beam member has a first datum feature, a second datum feature and a third datum feature, said first datum feature is located in a hinged portion that applies a load force to said head/slider assembly, said first datum feature is located in proximity and adjacent to a dimple for providing a gimbal motion of said head/slider assembly, said first datum feature has a V shaped portion, said second datum feature is a slot and is in proximity and adjacent to said spacer mounted at said pivot center of said arm member, said third datum feature is a slot and is in proximity and adjacent to an front end of said arm member.

6. A method for fabricating a head support arm comprising steps of:

preparing said head support arm containing
(i) an arm member having a rear portion with a pivot center and a front portion, and
(ii) a suspension load beam member having a rear portion fixed to said front portion of said arm member and a front portion supporting a head/slider assembly, and having a first datum feature, a second datum feature and a third datum feature, said first datum feature being located in a hinged portion that applies a load force to said head/slider assembly, said first datum feature being located in proximity and adjacent to a dimple for providing a gimbal motion of said head/slider assembly, said first datum feature having a V shaped portion, said second datum feature being a slot, and being in proximity and adjacent to a spacer mounted at said pivot center of said arm member, and said third datum feature being a slot, and being in proximity and adjacent to an front end of said arm member, and
(iii) an integrated wiring plate mounted on said suspension load beam member, and provided with a flexure;

fixing said arm member, said suspension load beam member, and said integrated wiring plate; and mounting said head/slider assembly on a front end of said integrated wiring plate of said head support arm by inserting datum pins of a first tool into said first datum feature and said second datum feature, respectively, said first tool supporting said head/slider assembly at a predetermined position.

7. A method according to claim 6, wherein, in said step (c), said datum pin inserted into said second datum feature is moved to cause said load beam member to engage said datum pin inserted into said first datum with said V shaped portion of said first feature.

8. A method for fabricating an arm assembly for a disk drive device having a plurality of head support arm comprising step of:

preparing a plurality of said head support arms each of which contains
- (i) an arm member having a rear portion with a pivot center and a front portion, and
- (ii) a suspension load beam member having a rear portion fixed to said front portion of said arm member and a front portion supporting a head/slider assembly, and having a first datum feature, a second datum feature and a third datum feature, said first datum feature being located in a hinged portion that applies a load force to said head/slider assembly, said first datum feature being located in proximity and adjacent to a dimple for providing a gimbal motion of said head/slider assembly, said first datum feature having a V shaped portion, said second datum feature being a slot, and being in proximity and adjacent to a spacer mounted at said pivot center of said arm member, and said third datum feature being a slot, and being in proximity and adjacent to an front end of said arm member, and
- (iii) an integrated wiring plate mounted on said suspension load beam member, and being provided with a flexure;

fixing said arm member, said suspension load beam member, and said integrated wiring plate, mounting said head/slider assembly on a front end of said integrated wiring plate of each of said head support arms by inserting datum pins of a first tool into said first datum feature and said second datum feature, respectively, said first tool supporting said head/slider assembly at a predetermined position; and arranging said plurality of head support arms in parallel to each other by inserting datum pins of a second tool into said pivot center of each of said arm member and said third datum feature, respectively, of each of said suspension load beam member.

9. A method according to claim 8, wherein, in said step (c), said datum pin inserted into said second datum feature is moved to cause said load beam member to engage said datum pin inserted into said first datum with said V shaped portion of said first feature.

10. A method for fabricating an arm assembly according to claim 8, wherein in said step (d), a spacer with an aperture is placed at said pivot center of each of said head support arms, and each of said head support arms is provided with a fixing aperture which is aligned to said aperture of said spacer, and said method comprises a step of fixing said plurality of head support arms by a fixing means passing through said fixing aperture of each of said plurality of head support arm and said aperture of each of said spacers.

* * * * *